Figure 1:
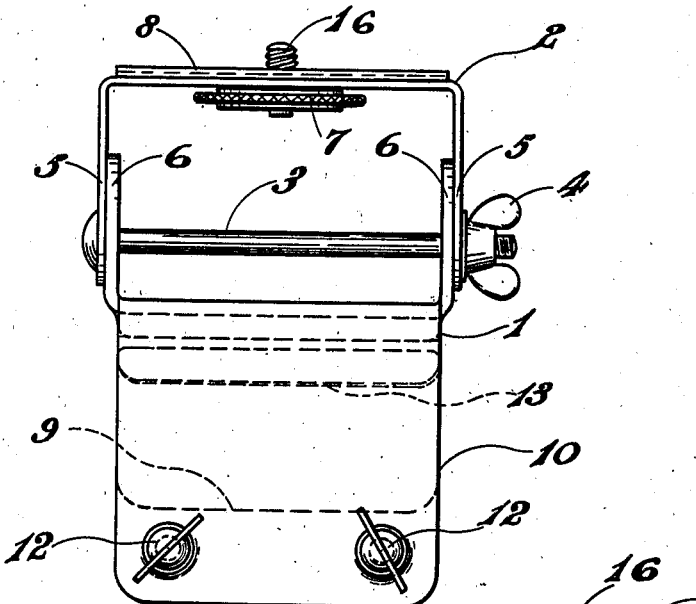

Dec. 14, 1943.   I. B. POLE-EVANS   2,336,801
MOUNTING DEVICE FOR CAMERAS AND THE LIKE
Filed April 28, 1941

Inventor,
I. B. Pole-Evans
By: Glascock Downing & Seebold
Attys.

Patented Dec. 14, 1943

2,336,801

UNITED STATES PATENT OFFICE 2,336,801

MOUNTING DEVICE FOR CAMERAS AND THE LIKE

Illtyd Buller Pole-Evans, Irene, Transvaal, Union of South Africa

Application April 28, 1941, Serial No. 390,843
In Great Britain February 10, 1941

2 Claims. (Cl. 248—226)

This invention relates to an improved mounting device, more especially for cameras, which has as its main object the provision of means for rigidly mounting a camera on a motor vehicle for the purpose of taking photographs from the vehicle.

The device is particularly useful to persons visiting game reserves and sanctuaries where the passengers of motor vehicles are prohibited from leaving their cars while in certain areas.

According to the invention broadly the device, in the form of a bracket adapted to be detachably secured to the sill of the window opening of a motor vehicle, consists of a lower clamp part arranged for clamping to the inside wall of the window housing cavity, and an upper camera-supporting part secured to said lower part for tilting movement about a horizontal axis, said upper part being provided with a camera mounting pin, a screw, or the equivalent, arranged to permit circular traversing movement of the camera in either direction. Means are provided for clamping the upper part in any desired position about its tilting axis.

More particularly the downwardly depending portion of the lower part is substantially of inverted U-shape with one limb forming a fixed clamping jaw and the other limb being provided with an adjustable clamping jaw operated for gripping purposes by one or more thumb or finger screws. In fixing the device in position, the fixed clamping jaw is inserted between the window pane and the inside wall of the window housing cavity of a vehicle door. As further means to secure rigidity by preventing canting, a flange part extends outwardly from the fixed clamping jaw so as to rest on the top edge of the outer wall of the window housing cavity when the device is clamped in position.

The upper part is likewise substantially of inverted U-shape, and the two limbs thereof are pivotally connected to two corresponding upstanding pivot lugs on the lower part. In the preferred construction, a single bolt constituting the pivot pin and a wingnut co-acting therewith, are employed for clamping the upper part in any desired position with respect to the lower part. Sufficient springiness in the said limbs or the lugs permits of this action taking place on tightening of the wingnut. It is to be understood that the axis of the pivot bolt is parallel with the faces of the clamping jaws. Projecting through the flat middle portion of the upper part and rotatably located therein is a mounting screw adapted to co-act with a tapped hole in the bottom of a camera. A knurled head is provided on the bottom end of this screw, which is readily accessible from underneath said middle portion for camera securing purposes. Preferably a rubber or like friction pad is provided on the top face of the middle portion so that the camera will normally remain in any set position.

The two parts of the device are readily made from sheet metal stamped and pressed to shape. Alternatively the parts may be cast.

To enable the invention to be more clearly understood and carried into practice, reference is now made to the accompanying sheet of drawings in which like references denote like parts throughout both views.

Figure 2:
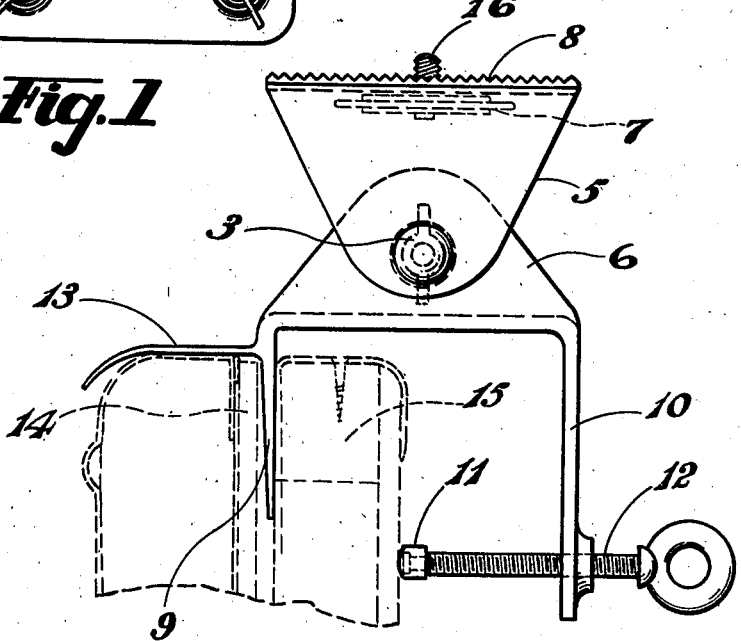

In the drawing:

Fig. 1 is a front elevation of a device constructed according to the invention and Fig. 2 is a side elevation of the device of Fig. 1, showing it in its clamped position in the window opening of a motor vehicle.

Referring to the drawing, reference 1 denotes the lower clamp part, to which the upper camera-supporting part 2 is pivotally secured by the bolt 3 and wingnut 4.

As shown, the downwardly depending limbs 5 of the upper part 2 fit over the upstanding lugs 6 of the lower part so that tightening of the wingnut 4 enables these two parts to be immovably clamped together in any desired tilted or upright position. The limbs 5 are made with sufficient resilience to achieve this object. This upper part 2 is provided with a screw-threaded camera-mounting pin 16 arranged to be rotated by its knurled head 7. A friction pad 8 of rubber is fixed to the top flat portion of the part 2, to prevent unwanted movement of the camera.

The lower part 1 is provided with the downwardly depending fixed jaw 9 and the opposing limb 10 carrying the adjustable jaw part 11 by means of the two eye screws 12, while extending outwardly from the fixed jaw 9, is the flange part 13. As shown in Fig. 2, the fixed jaw 9 is adapted to be inserted between the window pane 14, when in its fully lowered position, and the inside wall 15 of the window housing cavity of a motor vehicle door, of which the dotted outline represents in end view, the sill portion of the window opening therein. The gripping surface of the adjustable jaw 11 is preferably padded to increase its gripping action and prevent damage to the inside surface of the door. For similar reasons the underside of the flange part 13, is likewise covered with soft sheet material or fabric. It will be understood that the inner ends of the eye screws 12 are rotatably secured in the adjustable jaw 11.

What I claim is:

1. A mounting device for cameras in the form of a bracket adapted to be detachably secured to the sill of the window opening of a motor vehicle comprising in combination, a lower clamp part of substantially inverted U-shape arranged for attachment to the inside wall of the housing cavity of said window, adjustable clamping means carried by one downwardly depending limb of said part and operating towards the opposing limb for wall gripping purposes, an upper camera-supporting platform, spaced lugs on said lower part, spaced lugs on said platform, means pivotally connecting the first and second mentioned lugs to provide for tilting movement of said platform about a substantially horizontal axis, manually adjustable means for clamping the upper part to the lower part in any desired angular disposition about its tilting axis, and a camera mounting member in said platform arranged to permit traversing movement of the camera in either direction.

2. A mounting device for cameras in the form of a bracket adapted to be detachably secured to the sill of the window opening of a motor vehicle comprising in combination, a lower clamp part of substantially inverted U-shape arranged for attachment to the inside wall of the housing cavity of said window, adjustable clamping means carried by one downwardly depending limb of said part and operating towards the opposing limb for wall gripping purposes, an upper camera-supporting platform, spaced lugs on said lower part, spaced lugs on said platform, means pivotally connecting the first and second mentioned lugs to provide for tilting movement of said platform about a substantially horizontal axis, manually adjustable means for clamping the upper part to the lower part in any desired angular disposition about its tilting axis, and a camera mounting member in said platform arranged to permit traversing movement of the camera in either direction the other limb of the lower part constituting a fixed clamping jaw in said window housing cavity, and a flange part extending outwardly from said fixed jaw so as to rest on the top edge of the outer wall of the window housing cavity.

ILLTYD BULLER POLE-EVANS.